United States Patent [19]

Ditman, Jr.

[11] Patent Number: 4,880,296
[45] Date of Patent: Nov. 14, 1989

[54] OPTO-OPTICAL BEAN DEFLECTOR, MODULATOR, AND SHAPER

[75] Inventor: L. Samuel Ditman, Jr., Westminster, Md.

[73] Assignee: The United States of America as represented by the Secretary of the Navy, Washington, D.C.

[21] Appl. No.: 57,994

[22] Filed: Jun. 4, 1987

[51] Int. Cl.$^4$ .............................................. G02F 1/01
[52] U.S. Cl. ...................................... 350/354; 350/353
[58] Field of Search ............... 350/353, 354, 374, 380, 350/384, 389, 358; 332/7.51

[56] References Cited

U.S. PATENT DOCUMENTS

| | | | |
|---|---|---|---|
| 3,495,894 | 12/1965 | Lenzo et al. | 332/7.51 |
| 4,068,197 | 1/1978 | Yamazaka et al. | 332/7.51 |
| 4,115,747 | 9/1978 | Sato et al. | 350/355 |
| 4,143,939 | 3/1979 | Desormiere et al. | 350/355 |
| 4,387,343 | 6/1983 | Kondo | 332/7.51 |
| 4,443,066 | 4/1984 | Freyre | 350/358 |
| 4,508,431 | 4/1985 | Henshaw | 350/354 |
| 4,513,441 | 4/1985 | Henshaw | 382/43 |
| 4,540,244 | 9/1985 | Sincerbox | 350/354 |
| 4,673,257 | 6/1987 | Rokai et al. | 350/334 |

FOREIGN PATENT DOCUMENTS 0125925  8/1982  Japan .................................. 332/7.51

OTHER PUBLICATIONS

Solymar et al., "*Volume Holography and Volume Grating*," Academic Press, London (1981), p. 41.
Moharam et al., "Criteria For Raman–Nath Regime Diffraction by Phase Gratings", *Optics Communications*, vol. 32, No. 1, Jan 1980, pp. 19–23.
Jaaskelainen et al., "Diffraction Regimes of Phase Gratings", *Optics Communications*, vol. 64, No. 1, Oct. 1987, pp. 19–22.
Konstantinov et al., "Channeling of Light in a Medium with a Periodically Varying Refractive Index", *Sov. Phys. Solid State*, 24(11), Nov. 1982, pp. 1817–1821.
Siegman, "Proposed Picosecond Excited-State Measurement Method using a Tunable-Lasef-Induced Grating", *Applied Physics Letters*, vol. 30, No. 1, (1977).
Morimoto, Akihiro, Tetsuro Kobayashi and Tadasi Sueta, "A Picosecond Optical Gate Using Photo-Induced Grating", *Japanese Journal of Applied Physics*, vol. 20, No. 6, Jun. 1981, pp. 1129–1133.

*Primary Examiner*—Eugene R. LaRoche
*Assistant Examiner*—Nathan W. McLutcheon
*Attorney, Agent, or Firm*—Kenneth E. Walden; Frederick A. Wein

[57] ABSTRACT

The present invention relates to an optical beam deflector, beam modulator and beam shaper using a Raman-Nath diffraction methodology generated by a plurality of writing laser beams focused onto a bulk optical material having anisotropic optical characteristics for deflection, modulation, and shaping of a beam of light incident to the diffraction grating. The writing laser beams are split from a turnable laser source and the choice of the desired operational characteristic, i.e. deflector, modulator, and shaper are chosen by selective manipulation of the source beam and the derived split beams.

11 Claims, 1 Drawing Sheet

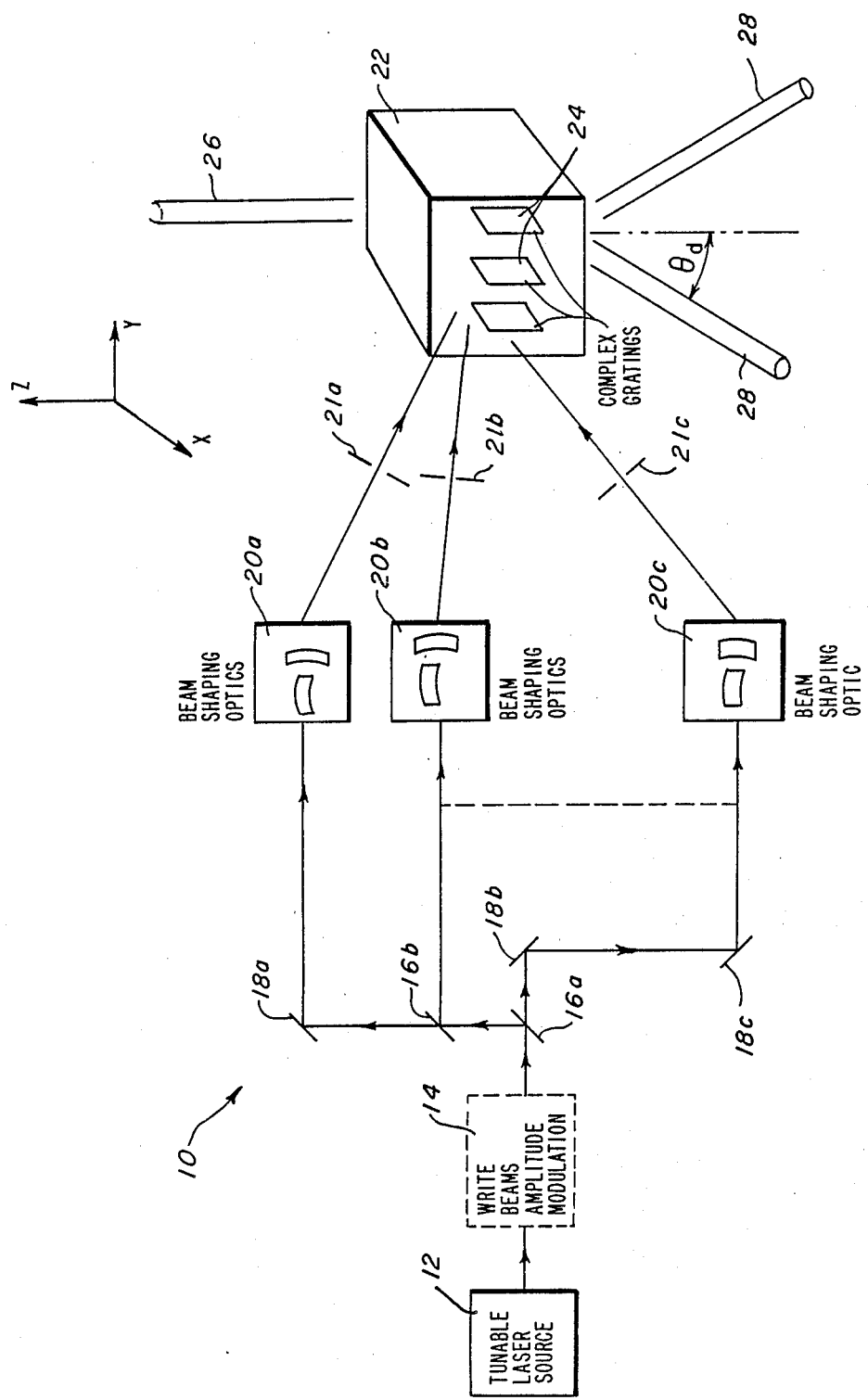

OPTO-OPTICAL BEAN DEFLECTOR, MODULATOR, AND SHAPER

BACKGROUND OF THE INVENTION

The present invention relates to optical instruments and more particularly optical instruments to deflect (steer), modulate, and shape a laser beam using all optical waves.

Older methods to steer, modulate and shape light beams involve movable mirrors and/or polarization rotators and/or acousto-optic elements such as acousto-optic drivers and electro-optic crystals, and lenses. In the prior art, acousto-optic modulators work on the principle of an acoustic (sound) wave being launched in an electro-optic crystal or liquid and inducing a modulation of the refractive index (a refractive index grating) in the crystal. An incident optical beam is steered and/or modulated by scattering light from this refractive index grating in a Raman-Nath diffraction process. The limitations of the acousto-optical beam deflection technique are (i) a source for generating acoustic waves is required, (ii) the acoustic source must be coupled to the electro-optic crystal because it is difficult to adjust the intensity and size of the acoustic source due to inadequacies of the acoustic wave generator whereas a laser beam can be passed through a variable spatial filter such as a variable sized aperture, as well as a variable neutral density filter, (iii) it is very difficult to shape the acoustic wave fronts and hence the refractive index grating planes in the material, and (iv) the acoustic waves launcher and its associated electronics at the launcher-crystal interface can be susceptible to large electromagnetic pulse disturbances or other forms of radiation. In contrast, the all-optical beam modulator as well as deflector and shaper of the present invention have none of these disadvantages.

SUMMARY OF THE INVENTION

Briefly, the present invention relates to an optical beam deflector, beam modulator and beam shaper using a Raman-Nath diffraction methodology generated by a plurality of writing laser beams focused onto a bulk optical material having anisotropic optical characteristics for deflection, modulation, and shaping of a beam of light incident to the diffraction grating. The writing laser beams are split from a tunable laser source and the choice of the desired operational characteristic, i.e. deflector, modulator, and shaper are chosen by selective manipulation of the source beam and the derived split beams.

It is an object of the present invention to provide an optical beam deflector, modulator and shaper using Raman-Nath diffraction gratings.

It is a further object of the present invention to provide an optical beam deflector, modulator and shaper using all optical components.

Further objects and advantages of the present invention will become apparent as the following description proceeds and features of novelty characterizing the invention will be pointed out with particularity in the claims annexed to and forming a part of this specification.

DESCRIPTION OF THE DRAWINGS

For a better understanding of the present invention reference may be had to the accompanying drawing which shows a schematic representation of the apparatus of the present invention.

DETAILED DESCRIPTION OF THE PREFERRED EMBODIMENT

The laser induced dynamic gratings in a photorefractive material such as barium titanate or other suitable material using a Raman-Nath diffraction probe technique is shown in the figure, wherein co-planar writing beams propagating in the x-y plane intersect inside the material and form an interference pattern, inducing phase grating planes, in this case, via the photorefractive effect. A probe beam propagating in the z-direction passes through and parallel to the grating planes and is diffracted. The resulting diffraction pattern can be seen on a screen which is parallel to the x-y plane and located beyond the crystal, the pattern consisting of a set of discrete intensity maxima (modes) which are symmetrically located about the M=O (undiffracted) order.

The theory of operation is as follows:

The angle of diffraction of a particular mode is a function of the ratio of probe beam wavelength to grating spacing in the crystal and is given by $$\theta_{DM} = \pm \text{ARCSIN } M\lambda_P/\Lambda_G$$

where $\theta_{DM}$ = angle of diffraction of the $m^{th}$ mode
$M$ = order of the mode, $M = 0,1,2,3,\ldots$
$\lambda_p$ = wavelength in the crystal of the probe beam, and
$\Lambda_G$ = grating spacing (period) in the crystal.

Assuming plane wave writing beams and planar gratings (which is not necessarily always the case), the grating spacing $\Lambda_G$ is given by $$\Lambda_G = \frac{\lambda_W}{2 \sin \theta/2}$$

where $\lambda_W$ = wavelength (in the crystal) of the write beams
$\theta$ = angle between the write beams in the crystal.

It is assumed that the refractive index grating modulation is spatially periodic in the x-direction. Applying standard diffraction theory to the electric field of the probe laser beam (assumed to be a plane wave), and taking the origin of the coordinate system to be point where the probe beam first intersects the induced gratings, the optical path in the grating at a point (x,y=0,z) is equal to $$[N_0 + N_1 \cos (KX)]Z$$

where $N_0$ = bulk refractive index of the crystal at the probe wavelength
$N_1 = \Delta N$ = refractive index modulation depth
$K = 2\pi/\Lambda_G$ = grating wave vector with the phase variation of the electric field of the probe beam being given by $$\text{EXP}[-2\pi j/\lambda_P[N_0 + N_1 \cos(KX)]Z]$$

which is a periodic function and which may be expanded into a fourier series.

As can be seen from calculations, the Raman-Nath intensity pattern consists of contributions from an infinite number of modes, M. The intensity of a particular mode, M, may vary considerably, depending on the particular value of the Bessel function $J^2(V)$, which is a function of V, where V is proportional to the product of grating thickness $Z$ ($=Z_1$) and refractive index modulation depth $N_1$, $$V = \beta N_1 Z_1 / N_0$$

An expression for the charge density, N, as a function of the space charge field, $E_{SC}$, can obtained from the Kukhtarev theory as:

$$N = AE_{SC}/B(A - E_{SC})$$

For example, for a large grating spacing for a Raman-Nath diffraction grating in an exemplary barium titanate crystal for two laser writing beams, $\lambda_W = 5145$ Å, having ordinary polarization (so that self-pumped phase conjugate gratings do not complete/interfere with the induced written gratings) have an intersection angle in air of 18.9°. The crystal is rotated to a position until an intensity maximum occurs for the M=2 mode. Simultaneously, it can be observed that the M=1 and M 32 3 diffracted orders have a very low intensity with respect to the intensity of the M=2 mode. At this position, the input angle (angle between beam 1 and the normal to the input face of the crystal) of beam 1 is $\theta_{i1} = 43.6°$, and the input angle of beam 2 is $\theta_{i2} = 62.5°$. The index of refraction for ordinary polarization in barium titanate at 5145 Å is $N_0$ (5145 Å)=2.488. Using Snell's Law, Angle of transmitted beam 1 in the crystal $= \theta_{t1} =$ ARCSIN (1)sin 43.6°/2.488 = 16.09°.

Angle of transmitted beam 2 in the crystal $= \theta_{t2} =$ ARCSIN intersection angle of the write beams in the crystal $= \theta = \theta_{t2} - \theta_{t1} = 4.8°$. The grating planes are at an angle $\theta_G$ to the normal of the crystal input face where $\theta_G = \theta_{t1} + \theta/2 = 18.49°$. Assuming the C-axis to be parallel to the input face of the crystal, the grating K-vector is at an angle $\theta_G = 18.49°$ to the C-axis.

The grating spacing, $\Lambda_G$, inside the crystal is $$\Lambda_G = \frac{\lambda_W}{2 \sin \frac{\theta}{2}} = \frac{5145 \text{Å}/2.488}{2 \sin \frac{4.8°}{2}} = 2.471961 \ \mu m = 24{,}719.61 \times 10^{-8} \text{ cm}$$

The angle of diffraction for the Mth mode of the probe base (which is applied parallel to the induced gratings with extraordinary polarization) is given by $$\theta_{DM} = \pm \text{ARCSIN} \frac{M \lambda_P}{\Lambda_G} = \pm \text{ARCSIN} \frac{M(6328\text{Å}/2.36)}{24{,}719.61\text{Å}}$$

where the index of refraction for extra-ordinary polarization in barium titanate at 6328 Å is $N_e$(6328 Å)=2.36. $\theta_{crit}$(6328 Å)=ARCSIN (1/2.36)=25.07°. Note that for M=4, $\theta_{D4} \sim 25.7°$ which is larger than the critical angle in barium titanate at 6328 Å, $\theta_{crit} = 25.07°$ so that M=4 mode and higher diffracted orders will not be observed but will be totally internally reflected.

When extraordinary waves are used, self pumped phase conjugation occurs and more complex gratings are formed such as for example in barium titanate where laser writing beams, $\lambda_W = 5145$ Å and also with extraordinary polarization, are applied to the input face of the barium titanate crystal in a direction normal to the plane of the writing beams in a Raman-Nath configuration. The resulting diffraction pattern consists of:

(a) The diffraction pattern one would expect from laser induced gratings formed, via the photorefractive effect, from the interference pattern of two coherent laser beams as per the above examples, (b) Complex interference patterns which result from the probe beam, $\lambda_p$, scattering off self-pumped phase conjugate (SPPC) gratings in the crystal. These diffraction patterns consist of curved lines which are symmetrically located about the M=0 order and have discrete intensity maxima and minima. For each SPPC beam, as the probe beam is spatially scanned across the interaction regions, there are two sets of "curved lines with structure" diffraction patterns corresponding to the two interaction regions of each SPPC beam, i.e. two induced SPPC complex gratings for each SPPC beam.

The diffraction patterns of the probe beam from SPPC gratings thus indicate that the induced gratings at each interaction region may be non-sinusoidal, consisting simultaneously of multiple grating vectors with higher order modes.

The existence of multiple gratings during SPPC in barium titanate is not surprising, since the "plane wave" input beams are observed to focus in the x-y plane in the crystal (similar to what would result from focusing with a cylindrical lens). The existence of multiple grating vectors in the interaction region for examples discussed above were also postulated from observations of patterns of the diffracted orders.

The higher order modes result from Raman-Nath diffraction.

In the above, each input laser writing beam had a diameter of 2.0 MM and an intensity of 20 milliwatt, giving an input power density 0.6 W/cm$^2$.

Turning now to the exemplary embodiment, the present invention is a device which uses optical beams to write a grating in a suitable medium, e.g., photorefractive ferroelectrics such as barium titanate, lithium niobate, potassium niobate, etc.; artificial Kerr media such as dielectric microspheres; photopolymers; photochromic materials; and thin films, etc, in which refractive index variations are related to localized light intensity variations in the material. A third beam, the beam-to-be-deflected, scatters or deflects off the phase grating via a Raman-Nath type diffraction process in a direction and at an angle determined by the grating spacing $\Lambda_G$, which is formed by the intersection beams which "write" the grating in the material. For photorefractive materials, this "writing" process occurs via the photorefractive effect in which light induces refractive index changes in the material.

The writing beams intersect in the material and cause a standing wave interference pattern in the material which in turn sets up a refractive index modulation in the material via the photorefractive effect for photorefractive materials. It is this refractive index modulation or phase grating which then deflects (diffracts), modulates, and/or shapes the third beam as disclosed herein. The standing wave light intensity pattern may be obtained, for example, from a single laser source, the path of each beam from the source being within a coherence length of the laser source. The third beam which is to be deflected does not enter the material at the Bragg angle to the grating but rather it enters in a Raman-Nath type configuration in which the third beam enters the material parallel to the grating planes which, for plane waves in the material, is normal to the plane of incidence of the writing beams. For the Bragg angle deflector maximum diffracted intensity would have to be varied for such angle. To achieve maximum deflection efficiency using Bragg angle deflectors, the incident angle must be at the Bragg angle to satisfy the Bragg condition and must be constantly adjusted for each separate deflection angle. In contrast to the Bragg angle deflectors which require that the beam-to-be deflected (the probe beam in the above description) be incident to the grating at the Bragg angle, for the present Raman-Nath deflector, the beam-to-be deflected is incident parallel to the induced grating planes, i.e. normal to the plane of the incident writing beams. Thus, for Raman-Nath scattering, the beam is normal to the induced grating plane, for all desired deflection angles.

A number of grating modes can exist in the material. Further, by using cylindrical lenses to shape the phase fronts of the input writing beams, complex phase gratings (i.e. multispaced or variable pitch refractive index phase gratings) can be impressed in the material leading to various diffraction patterns as well as various modes in the deflected beam. These complex gratings act as a diffraction grating lens for the third beam. The slewing time response of the deflection process is a time characteristic of grating formation of the material. The grating spacing and hence the amount of deflection may be varied by either (a) changing wavelength of the writing beams as for example with a tunable laser, the resolvable spot capability being a function of the wavelength tunability resolution of the tunable laser and the divergence of the third beam, and/or (b) varying the input angle (crossing angle) between the writing beams taken two at a time for plane wave writing beams and subsequent volume gratings.

The deflection of the third beam is given by $$\theta_P = \pm \text{SIN}^{-1}(M\lambda_P/\Lambda)$$

Turning now specifically to the drawing wherein like items are designated with like numerals there is shown a representation of the apparatus of the present invention. The opto-optical beam deflector, modulator, and shaper of the present invention, generally designated 10, comprises a laser source 12 providing a write beam, a write beam amplitude modulator 14 for intensity amplitude modulating the write beam, a plurality of beam splitters 16a,b, for splitting the source write beam into a plurality of related light beams all within a coherence length, a plurality of mirrors 18a,b and c, for directing the split light beams, all within a coherence length a plurality of beam shaping optics 20a,b and c, for focusing the respective split light beams, and a bulk optical material 22 having anisotropic optical characteristics for the forming of the Raman-Nath diffraction grating 24 within the bulk material 22 in order to deflect, modulate and/or shape an incident beam 26, and sensing of the deflected, modulated or shaped beams 28 outputted from the bulk material 22.

Continuous tunable laser source 12 is any appropriate laser, or an excimer laser, or includes within its definition, the substitution of discrete laser sources of fixed laser frequency, such as with the use of shutters and mirrors.

The write beam intensity amplitude modulator 14 is used for the modulator embodiment and comprises any modulator appropriate for such purpose, such as modulators using Pockles or Kerr effect with Pockles being preferred because of the linearity, "Q" switching of the cavity of the laser, a variable neutral density filter, or electronic power supply switching for a solid state laser, if applicable, if it has a sufficient coherence length.

The write beam from modulator 14 is then split as many times as required by beam splitters 16 in order to provide a sufficient number of beams depending upon the number of plates in the defraction grating 24 with one pair of beams being used to form one set of grating spacings. It should be noted that a split beam can be paired with two of the other split beams for forming 3 grating spacings with three beams.

The intensity of modulation (amplitude modulation) of the deflected beam may be obtained by either varying or modulating the effective grating thickness which is obtained by either(a) modulating the permittivity modulation via intensity amplitude modulation of the writing beams at modulator 14, or (b) modulating the grating thickness via writing beam phase front shaping lenses 20 using for example cylindrical lens combinations at the input writing beam phase fronts which form the grating profile in the material via the photorefractive effect, (c) modulating the coherence parameters (coherence length) of the writing beam laser source, for example by modulating the beam path lengths with respect to each other using optical delay lines, or (d) using variable apertures 21 to adjust the input write beam diameters thereby modulating the standing wave interference pattern which induces the grating in the material.

The beam shaping optics 20 comprise appropriate optics for precisely focusing the respective incoming beams onto the bulk material 22. Optics 20 can be lenses which are spherical, cylindrical, or otherwise, fiber optics, or other appropriate devices.

Beam shaping is obtained by lens combination which create the desired wavefronts of the write beams which induce the phase gratings. For example, in barium titanate, if one writing beam is a plane wave and the other write beam is a cylindrical wave, the resulting induced phase grating in the material is a refractive index modulation related to the light intensity of the interference pattern of the writing beams, which for the case cited are parabolic in shape. The curved gratings thus act as a sort of holographic lens.

Bulk material 22 is an appropriate optical material having anisotropic light characteristics and in the exemplary embodiment is barium titanate ($BaTiO_3$) although other appropriate materials can be used, for example and not by limitation, liquids or gases can be used for higher intensity beams.

The Raman-Nath diffraction grating is generated with the bulk material 22 by interference patterns as discussed elsewhere herein which are created internal to the medium, using Pockles interaction, density variation, photorefraction, photochromism, thermal gratings, radiation pressure gradients, and lead to index of refraction changes, etc. The spacing of the gratings is a function of the crossing angle and the writing beam wavelength in the material.

Beam 26 is incident to the diffraction grating 24, parallel to the individual grating planes of grating 24. The mathematical treatment of the wave interaction of the beam and the grating is well known and is provided in Solymar and others. The bulk material 22 can be rotated for its birefringent axis to be parallel to the beam 26 and the planes of grating 24 will be similarly adjusted.

Grating 24 can be dynamic or transient, depending on the characteristics of the writing beams and also of the medium materials 22. Dynamic or transient gratings are gratings which disappear after the inducing light source has been switched off. In contrast, permanent gratings remain in the material.

As is shown in the FIGURE, the diffraction grating deflects beam 26 an angle theta which is a function, inter alia, of the spacing between the planes and does not depend upon Bragg scattering diffraction as in the more common diffraction gratings.

In the modulator mode, the source beam is amplitude modulated in modulator 14. As the intensity of all or some of the split write beams are changed, the characteristics of the plates change. The output beam 28 is accordingly modulated as discussed elsewhere herein.

The grating planes of grating 24 are shown as parallel plates. However, if these plates are made unplanar such as using lense to reform the plates into curved planes for focusing beam 26, then the shape of the output beam 28 can be changed or focused. The plates of grating 24 are shaped by writing beam shape optics 20 which shaping their respective writing beam phase fronts and which in turn induce curved grating planes of variable spacing. The beam shaping optics can comprise spherical lenses, cylindrical lens, both can be positive or negative, with variable focusing. This could not be done by acoustic waves previously used to form pressure waves within a bulk material and thus locally changing the index of refraction within the bulk material 22.

In an alternate embodiment, the bulk material 22 can be rotated while keeping the write beams stationary.

As shown in the equations elsewhere herein, changing of appropriate parameters can be used for changing the size and spacing of the diffraction plates, the orientation of the plates, the thickness of the plates, the distance between the plates, and the shape of the plates to nonplanar configurations.

In summary, opto-optical beam deflection and the gratings are optically induced. All optical beams are used to form the gratings compared to acousto-optical beam deflection which uses acoustic waves to modulate the refractive index of a material which in turn deflects (diffracts) the beam-to-be-reflected (steered). An optical Raman-Nath type of diffraction occurs when the beam-to-be-deflected scatters or diffracts from the optically induced gratings, compared to acousto-optical Raman-Nath deflection in which an optical beam is deflected from off of acoustically induced gratings.

Additionally, there is no stringent input angle requirement of the beam-to-be-deflected (diffracted) since for the optically induced volume phase gratings with Raman-Nath type diffraction, the input angle of the beam-to-be-deflected is approximately 90° (i.e., normal) to the plane of incidence of the writing beams which induce the phase grating. Multiple gratings are induced by multiple writing beams taken two at a time, leading to multiple deflected (diffracted) beams.

The deflected beam is slewed (spatially scanned) by either (i) scanning or varying the crossing angle in the material of the writing beams with respect to each other, or (ii) scanning or varying the wavelength of the writing beams since the grating spacing Λ determines the amount of deflection where $$\Lambda = \frac{\lambda_W}{2 \sin\frac{\theta}{2}} = \frac{\lambda_{WAIR}}{(\eta_e \lambda) 2 \sin\frac{\theta}{2}}$$

where $\lambda_W$ is the wavelength of the writing beam in the material, theta is the angle of separation of the write beams inside the medium material (i.e., the crossing angle), $n_e\lambda$ is the refractive index (for the extraordinary polarization in barium titanate) in the material at the writing beam wavelength, $\lambda_{wair}$ is the wavelength of the writing beams in air. By wavelength tuning (scanning) a tunable laser source of the writing beams, $\lambda_{wair}$, a corresponding tuning (scanning) of the grating spacing, Λ, is obtained. Scanning the grating spacing, Λ, causes a corresponding scan in the deflection angle of the beam-to-be-deflected and varies as an inverse sine function of the grating spacing as $$\theta_{DM} = \pm \sin^{-1}(M\lambda_p/\Lambda)$$

where $\lambda_p$ is the wavelength of the beam-to-be-deflected in the material, $\lambda_{wair}$ is the wavelength of the beam-to-be-deflected in air, $\theta_{dm}$ is the mth order deflected (diffracted) angle, m is the mode or order of the diffraction grating, Λ is the grating spacing in the material, and Λ/m is the spacing of the mth mode, and $\lambda_p = \lambda_{pair}/\eta_{e\lambda pair}$.

It is contemplated that the present invention can be usable where it is required to accurately position a laser beam in the far field, and as an alternative to acousto-optic deflection techniques.

Accordingly, there is herein disclosed an optical system where all optical beams are used to write the grating in the medium, the beam to be steered is applied to the crystal in a direction parallel to the grating planes, which is known as Raman-Nath type of diffraction, in contrast to Bragg angle scattering, and the shape of the refractive index grating planes in the material are easily changed by shaping the phase front of the write beams by using, for example, cylindrical lens combinations.

What is claimed is:

1. An optical beam deflector comprising:
   a bulk optical material having aniosotropic light transmissive characteristics,
   a tunable laser,
   beam splitting means for splitting the light beam outputted from the laser into two or more beams, and
   means for focusing each of the split light beams into the bulk optical material, each of the split light beams being focused in a predetermined relationship to each of the other split light beams so as to form a Raman-Nath diffraction grating within the optical material for deflecting a beam of light incident to the grating.

2. The optical beam deflector of claim 1 wherein the deflector further comprises means for varying the focused predetermined angle between the split light beam, whereby the deflection of the light beam incident to the grating is changed.

3. An optical beam modulator comprising:
   a bulk optical material having anisotropic light transmissive characteristics,
   a laser,
   means for amplitude modulation of the light beam outputted from the laser,
   beam splitting means for splitting the light beam into two or more beams, and means for focusing each of the split light beams onto the bulk optical material, each of the split light beams being focused in a predetermined relationship to each of the other split light beams so as to form a Raman-Nath diffraction grating within the optical material, the intensity of a beam of light incident to the grating being modulatable by amplitude modulating the laser output beam with the means for amplitude modulation.

4. An optical beam shaper comprising:
a bulk optical material having anisotropic light transmissive characteristics,
a tunable laser,
beam splitting means for splitting the light beam into two or more beams, and
means for focusing each of the split light beams into the bulk optical material, each of the split light beams being focused in a predetermined relationship to each of the other split light beams so as to form a Raman-Nath diffraction grating within the optical material, the means for focusing providing means for changing the shape of a beam of light incident to the grating by change of the focused predetermined relationship of the split light beams.

5. The optical beam shaper of claim 4 wherein the change of focused predetermined relationship comprises a change of the crossing angle of the split light beams.

6. The beam shaper of claim 5 wherein the bulk optical material is crystalline.

7. An optical beam deflector comprising:
a bulk optical material having anisotropic light transmissive characteristics, and
means for optically inducing a Raman-Nath diffraction grating within the optical material for deflecting a beam of light incident to the grating.

8. An optical beam modulator comprising:
a bulk optical material having anisotropic light transmissive characteristics, and
means for optically inducing a Raman-Nath diffraction grating within the optical material for modulating the intensity of a beam of light incident to the grating.

9. An optical beam shaper comprising:
a bulk optical material having anisotropic light transmissive characteristics,
means for optically inducing a Raman-Nath diffraction grating within the optical material, and
means for changing the shape of a beam of light incident to the grating.

10. An optical beam modulator comprising:
a bulk optical material having anisotropic light transmissive characteristics,
a laser,
means for amplitude modulation of the light beam outputted from the laser,
beam splitting means for splitting the light beam into two or more beams, and
means for focusing each of the split light beams onto the bulk optical material, each of the split light beams being focused in a predetermined relationship to each of the other split light beams so as to form a Raman-Nath diffraction grating within the optical material, the intensity of a beam of light incident to the grating being modulatable by changing the predetermined focused relationship of the split light beams.

11. An optical beam modulator comprising:
a bulk optical material having anisotropic light transmissive characteristics,
a laser,
means for amplitude modulation of the light beam outputted from the laser,
beam splitting means for splitting the light beam into two or more beams, and
means for focusing each of the split light beams onto the bulk optical material, each of the split light beams being focused in a predetermined relationship to each of the other split light beams so as to form a Raman-Nath diffraction grating within the optical material, the intensity of a beam of light incident to the grating being modulatable by changing the coherence length of at least one of the split light beams.

* * * * *

UNITED STATES PATENT OFFICE
CERTIFICATE OF CORRECTION

Patent No. 4,880,296    Dated November 14, 1989

Inventor(s) L. Samuel Ditman, Jr.

It is certified that error appears in the above-identified patent and that said Letters Patent is hereby corrected as shown below:

In the title of the invention appearing on the title page and in column 1, line 1, change "BEAN" to --BEAM--;

In the title page, under "OTHER PUBLICATIONS" (2nd column, line 10), change "Lasef" to --Laser--.

Under ABSTRACT, line 8, change "turnable" to --tunable--.

Column 2, line 26, change "$M\lambda P/A_G$" to --$M\lambda\rho/\Lambda_G$--.

Column 6, line 6, change "defraction" to --difraction--.

Signed and Sealed this

Thirtieth Day of October, 1990

Attest:

HARRY F. MANBECK, JR.

*Attesting Officer*   *Commissioner of Patents and Trademarks*